(12) United States Patent  (10) Patent No.: US 8,291,958 B2
Bartoli  (45) Date of Patent: Oct. 23, 2012

(54) MACHINE FOR FITTING AND REMOVING THE TIRES OF VEHICLES

(75) Inventor: Pietro Bartoli, Correggio (IT)

(73) Assignee: Sicam S.r.l., Correggio (RE) (IT)

( * ) Notice: Subject to any disclaimer, the term of this patent is extended or adjusted under 35 U.S.C. 154(b) by 314 days.

(21) Appl. No.: 12/659,510

(22) Filed: Mar. 11, 2010

(65) Prior Publication Data

US 2010/0243173 A1   Sep. 30, 2010

(30) Foreign Application Priority Data

Mar. 27, 2009  (IT) .............................. MO2009A0078

(51) Int. Cl.
 B60C 25/138 (2006.01)
 B60C 25/132 (2006.01)
(52) U.S. Cl. ...................................... 157/1.24; 157/1.17
(58) Field of Classification Search .................. 157/1.1, 157/1.17, 1.22, 1.24
 See application file for complete search history.

(56) References Cited

U.S. PATENT DOCUMENTS

| | | | |
|---|---|---|---|
| 7,128,119 B2 | 10/2006 | Corghi | |
| 7,712,510 B2 * | 5/2010 | Zoller | 157/1.24 |
| 2002/0162633 A1 | 11/2002 | Mimura | |
| 2005/0247409 A1 | 11/2005 | Corghi | |
| 2008/0066873 A1 * | 3/2008 | Zoller | 157/1.17 |
| 2008/0179014 A1 | 7/2008 | Sotgiu | |
| 2011/0155329 A1 * | 6/2011 | Magnani | 157/1.17 |

FOREIGN PATENT DOCUMENTS

| | | |
|---|---|---|
| IT | 1342902 | 7/2003 |
| WO | WO 2010026539 A1 * | 3/2010 |

* cited by examiner

*Primary Examiner* — David B Thomas

(74) *Attorney, Agent, or Firm* — Stein McEwen, LLP

(57) ABSTRACT

A machine for fitting and removing the wheel tires of vehicles comprises a base frame with a turntable for gripping and rotating a rim of wheels for vehicles with at least a retention flange and a bead of a tire to be fitted on, or removed from, the rim; an operating head is operatively associated with the base frame, and is positionable near the retention flange. The operating head includes a guiding nut for the bead; a guiding wing for the bead; a grip tool for gripping the bead which is arranged between the guiding nut and the guiding wing, and includes a shaped active extremity with an oblique profile suitable for cooperating with the guiding nut for guiding the bead. Actuator assembly moves the grip tool between a first guiding configuration of the bead, in which the active extremity is arranged near the guiding nut and near the guiding wing, and a second grip configuration of the bead. The actuator assembly moves the grip tool from the first configuration to the second configuration along a first trajectory and from the second configuration to the first configuration along a second trajectory, substantially different from the first trajectory.

18 Claims, 5 Drawing Sheets

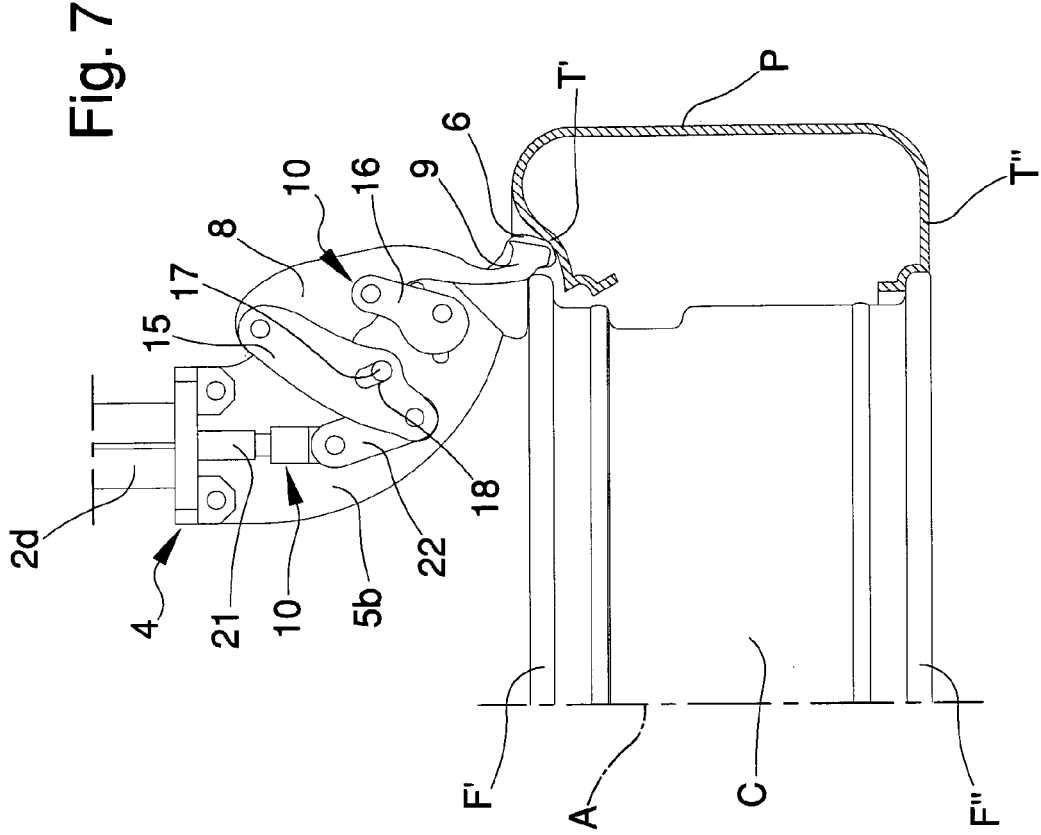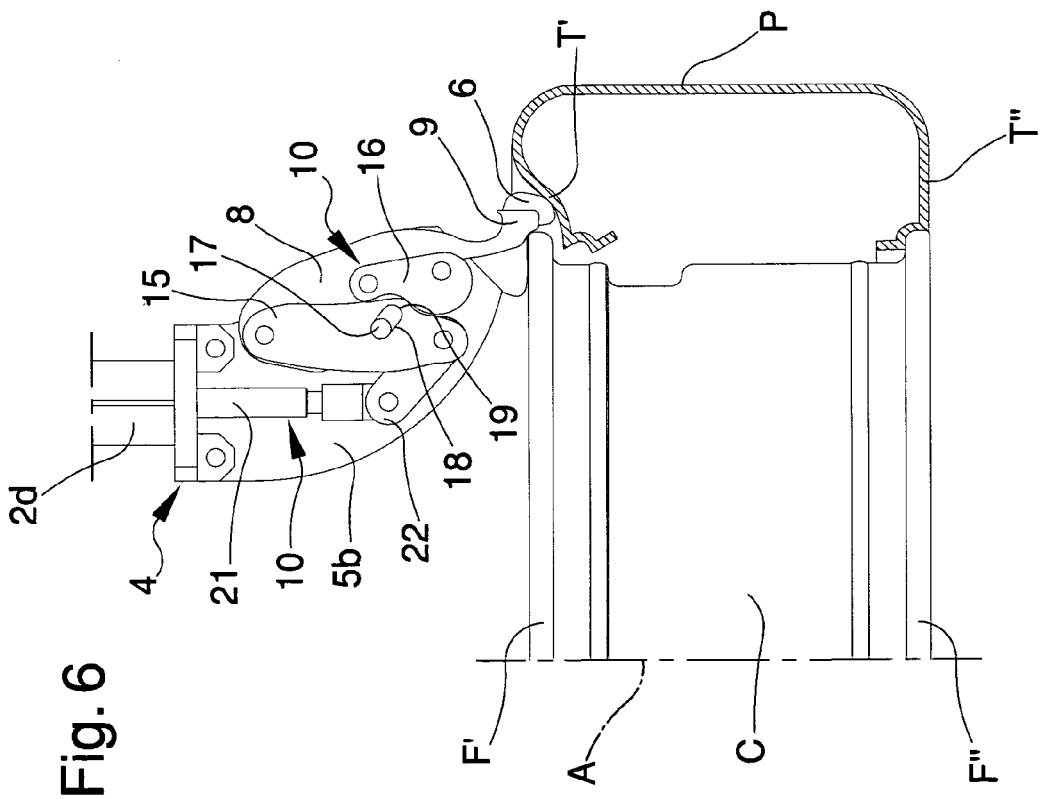

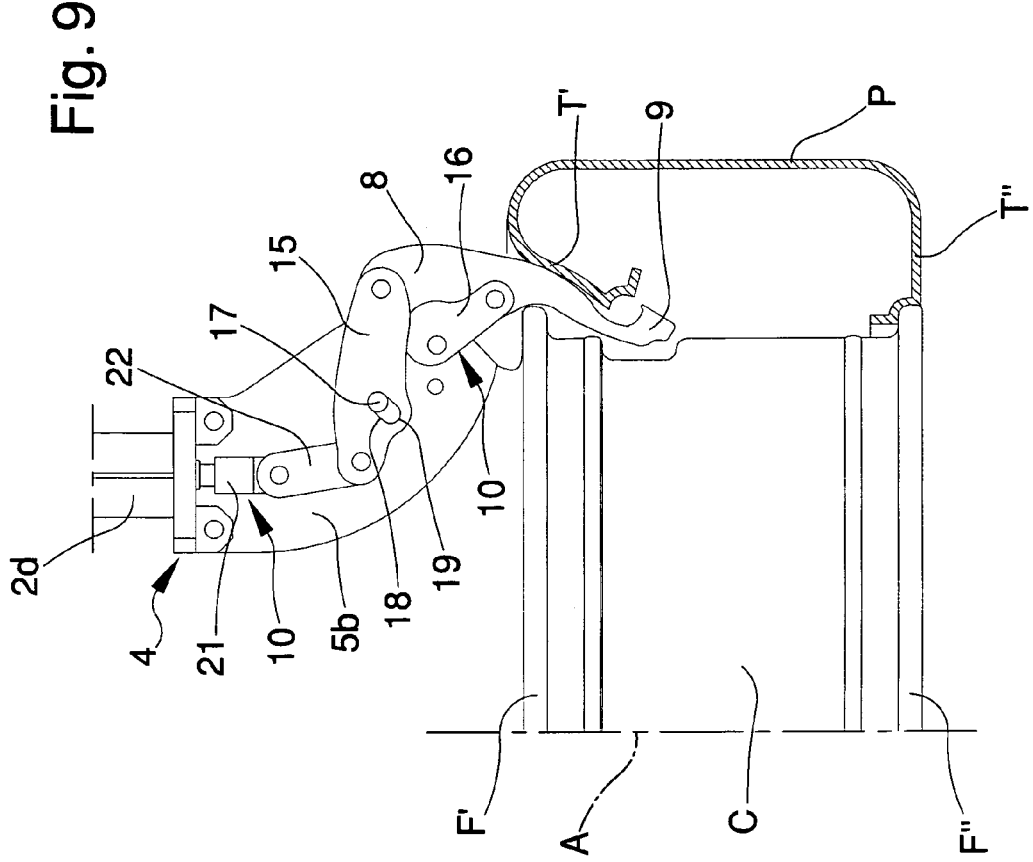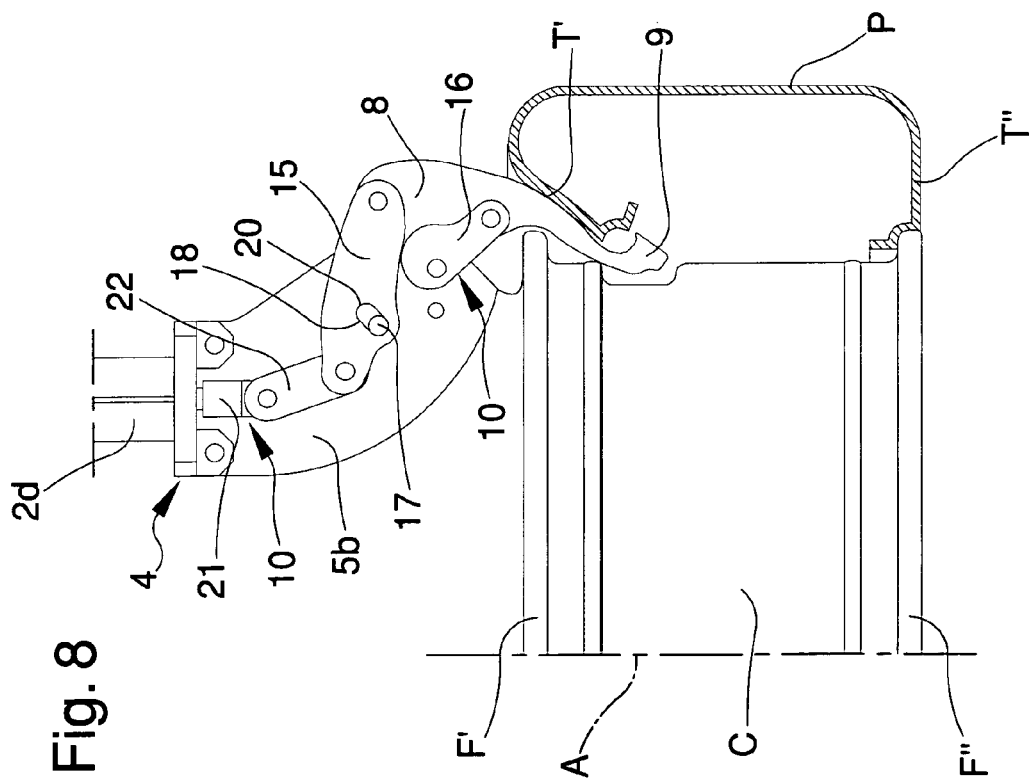

MACHINE FOR FITTING AND REMOVING THE TIRES OF VEHICLES

TECHNICAL FIELD

The present invention relates to a machine for fitting and removing the wheel tires of vehicles.

BACKGROUND OF THE INVENTION

It is known that the wheels for tires of vehicles consist of a cylindrical rim made of metal having, at the axial extremities, annular retention flanges between which is defined a channel for pressure fitting a tire.

In fitting configuration, the side portions of the tire, so-called "beads", are stopped up tight against the retention flanges.

Inside the tire, an inner tube can be fitted or, in the case of "tubeless" type tires, air under pressure can be directly introduced.

To perform the tire fitting and removal operations onto and from the relative rims, tire changing machines are currently used which allow removing the tire from the relevant rim, to perform maintenance jobs or replace the inner tube, the rim and/or the tire itself, and then refitting the same tire, or a replacement tire, on the wheel rim.

Traditionally, the tire changing machines are composed of a base frame which supports grip and rotation moving means for the wheel rim being worked upon.

The rotation axis of the grip and rotation moving means can be vertical or horizontal according to the type of tire changing machine.

In a particular type of vertical-axis tire changing machine, for example, the base frame is shaped to define a vertical upright supporting a traditional work tool positionable near a retention flange of the rim to separate and remove the relative tire bead, during the removal phase, as well as to guide the bead inside the channel defined among the retention flanges, during the fitting phase.

Such traditional work tool is composed of a pair of bead guide elements integrated into a single rigid body, made of metal or plastic.

One of these elements, conventionally called "guiding wing", has a particularly complex shape that reproduces a portion at least in part of truncated cone shape, with a protruding base edge that acts as a locator for the tire bead.

The other element on the other hand has a more or less spherical shape, and because of this is conventionally called a "guiding nut".

The guiding nut and the guiding wing are arranged substantially away from one another according to a preset geometry.

In an operating configuration, in particular, the traditional work tool is arranged with the guiding wing resting on the rim retention flange, with the base edge following the circumference, at least in part, and with the guiding nut protruding beyond the retention flange.

To allow taking the bead out of the rim channel, the traditional work tool has a horizontal tang extending from the guiding nut on the opposite side to the guiding wing.

During operation, this tang is arranged in the proximity of the flange to act as a resting fulcrum for a manual bead extraction lever.

In fact, during tire removal, the tire changing machine operator inserts a manual lever between the bead and the retention flange and, by levering on the horizontal tang, moves the bead beyond the retention flange until it is above the guiding nut.

In this position, a part of the bead remains under the guiding wing, while another part is placed above the guiding nut. By turning the rim and, if necessary, with the aid of the manual lever, the operator is able to extract the bead from the entire length of the retention flange.

The traditional work tool has various drawbacks tied, in particular, to its not very functional and practical operation and to the fact that the operator has to perform laborious and tiring jobs with the manual lever.

To overcome such drawbacks, different types of automatic turrets are known that replace the previously described traditional work tool.

An example of turret is described in the U.S. Pat. No. 7,128,119, granted Oct. 31, 2006, and corresponding European Patent No. 1,593,533 and comprises a grip tool (4, 4a) designed to grip the tire bead and remove it from the rim in an automatic way, without tiring the operator.

For this purpose, the grip tool is mobile between an insertion configuration and an extraction configuration by means of an articulated quadrilateral mechanism (described in column 3, lines 9-15) with movement started by a linear actuator (5, 5a).

More in detail, the articulated quadrilateral mechanism enables the grip tool to perform an insertion stroke (as shown in FIG. 5), pushing itself between the tire bead and the rim retention flange, and an identical return stroke, gripping the tire and extracting it from the rim (as shown in FIG. 6).

In this respect, it must be underlined that, sometimes, the trajectory covered by the grip tool during its insertion and its extraction can cause bothersome and excessive stress to the tire bead, with the risk of damaging it considerably and negatively affecting the safety of the wheel on the road.

In fact, to insert and extract the grip tool correctly and without wearing down the bead too much, the grip tool ought to be inserted at a specific angle and then extracted at a different angle; the presence of a mechanism with a degree of freedom such as the articulated quadrilateral mechanism envisaged in the turret, described in U.S. Pat. No. 7,128,119, however, rules out such possibility.

Another type of turret is described in patent IT 1 342 902 and comprises a support structure that can be placed resting on the rim of the wheel being machined and which has two operating levers.

The first lever is designed to be arranged astride the retention flange to keep away the bead.

The second lever, on the other hand, has a bead grip foot and is designed to be introduced between the retention flange and the bead to grip and extract the latter.

It is underlined that, unlike what happens with the grip tool of U.S. Pat. No. 7,128,119 and in the patent IT 1 342 902, the trajectory covered by the second lever during introduction into the rim channel is different from that covered during extraction.

This turret of known type is however also susceptible to further upgrading in order to make it less complex in terms of construction and operation.

Furthermore, another type of turret is known having a mobile grip tool for insertion and extraction arranged between a first and a second guiding nut with a shape substantially the same as that of the traditional work tools.

Alongside the first guiding nut, furthermore, a guiding wing is fitted.

When the turret is arranged in operating position in the proximity of the retention flange, therefore, the following elements are positioned in succession along the flange: the guiding wing, the first guiding nut, the grip tool and the second guiding nut.

It must be underlined that this turret also has a number of drawbacks tied, in particular, to the geometric shapes of the guiding wing, of the guiding nuts and of the grip tool which do not allow a correct and perfect operation to guide the tire bead to be fitted and/or removed.

At the same time, it is pointed out that, similarly to U.S. Pat. No. 7,128,119, this automated turret also envisages an articulated quadrilateral mechanism to operate the grip tool and, consequently, it is affected by the same drawbacks tied to the limited movement already described in relation to U.S. Pat. No. 7,128,119.

BRIEF SUMMARY OF THE INVENTION

The main aim of the present invention is to eliminate the drawbacks of the prior art machines discussed above by providing a machine for fitting and removing the wheel tires of vehicles that is practical, easy and functional to use, and which has greater operating flexibility and is less complex in terms of construction and operation compared to tire changing machines of known type.

Another object of the present invention is to provide a machine for fitting and removing the tires of vehicles which allows gripping and extracting the beads of tires without overstressing the latter and ensuring their utmost integrity.

Another object of the present invention is to provide a machine for fitting and removing the tires of vehicles which overcomes the mentioned drawbacks of the known art in the ambit of a simple, rational, easy, effective to use and low cost solution.

The above objects are achieved by the present machine for fitting and removing the wheel tires of vehicles, comprising:
a base frame supporting grip and rotation moving means for gripping and rotation moving a rim of wheels for vehicles with a retention flange for cooperation with a bead of a tire to be fitted and/or removed on/from said rim;
an operating head which is operatively associated with said base frame and is positionable near said retention flange;
wherein said operating head comprises:
a guiding nut of said bead;
a guiding wing of said bead;
a grip tool for gripping said bead, and which is arranged between said guiding nut and said guiding wing, and comprises a shaped active extremity with a substantially oblique profile suitable for cooperating with said guiding nut for guiding said bead; and
an actuator assembly for moving said grip tool between (1) a first guiding configuration of said bead, in which said active extremity is arranged near said guiding nut and near said guiding wing, and (2) a second grip configuration of said bead, said actuator assembly moving said grip tool from said first configuration to said second configuration along a first trajectory, and from said second configuration to said first configuration, along a second trajectory substantially different from said first trajectory.

BRIEF DESCRIPTION OF THE DRAWINGS

Other characteristics and advantages of the present invention will become more evident from the description of a preferred, but not sole, embodiment of a machine for fitting and removing the wheel tires of vehicles, illustrated purely as an example but not limited to the annexed drawings in which:

FIGS. 6-10 show the tire removal operation made by the machine according to the invention, in a succession of views in section along a substantially vertical plane and coplanar to the rotation axis of the rim.

DETAILED DESCRIPTION OF THE INVENTION

Figure 1:
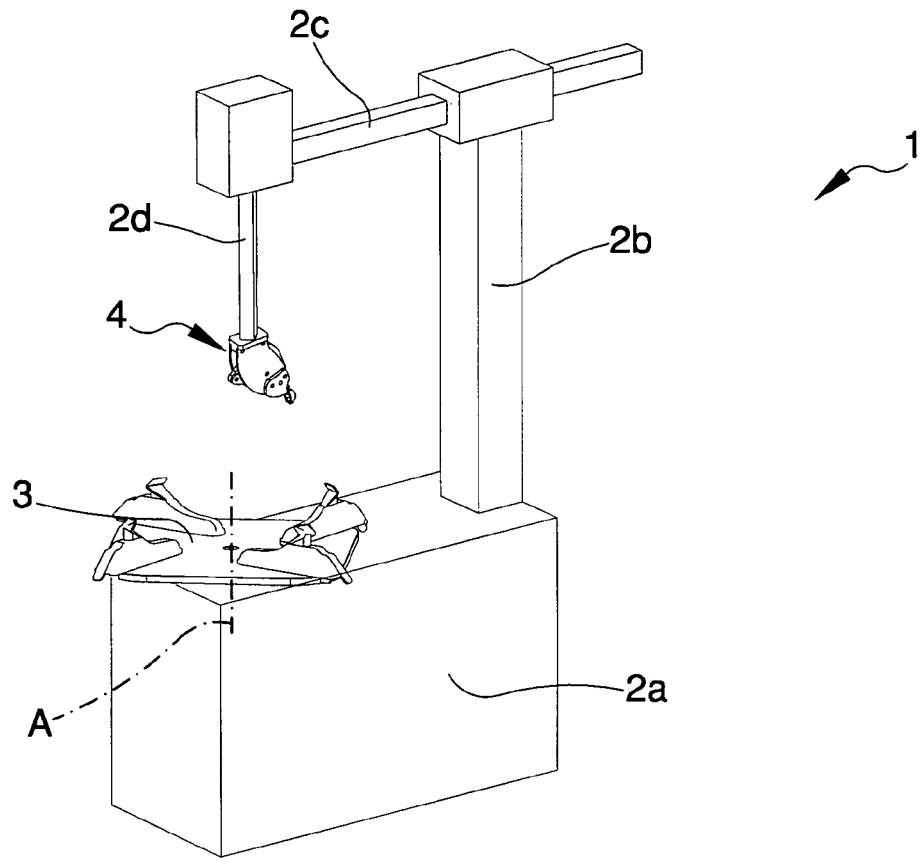
FIG. 1 is an axonometric view of the machine according to the invention.
Figure 2:
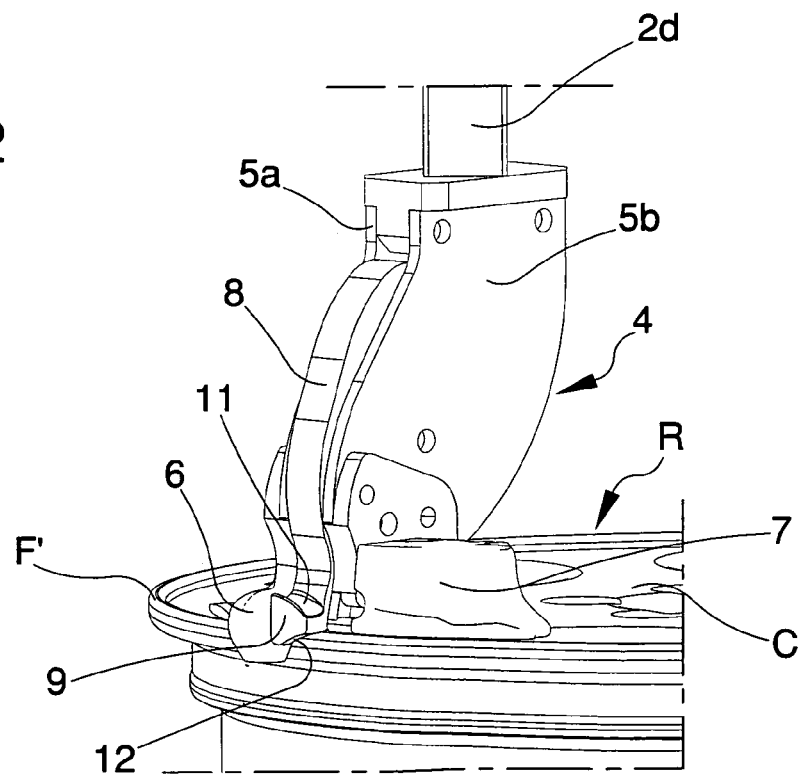
FIG. 2 is an axonometric view, from another angle and on an enlarged scale, of a detail of the machine according to the invention.

With particular reference to such figures, globally indicated by 1 is a machine for fitting and removing the tires of vehicles.

The machine 1 comprises a base frame 2a, 2b, 2c, 2d which supports a turntable 3, for gripping and rotation moving a rim C of wheels R for vehicles around a rotation axis A coinciding with the axis of the rim C.

The rim C has a first retention flange F', suitable for retaining a first bead T' of a tire P to be fitted/removed to/from the rim C, and a second retention flange F'', suitable for retaining a second bead T'' of the tire P.

In the particular embodiment of the invention shown in the illustrations, the rotation axis A is arranged substantially vertical and, conventionally, indicated as first retention flange F' is that which in operation is designed to be arranged above and as second retention flange F'' that which in operation is designed to be arranged below.

Obviously, alternative embodiments of the invention are contemplated in which the rotation axis A is substantially horizontal or oblique.

In this respect, it is specified that in the present application, the arrangement of specific components above and/or below others, meaning at top and/or bottom with respect to others, is referred by example and in a non-restrictive way to the particular embodiment shown in the illustrations, in which the rotation axis A is vertical. The same principles would obviously be incorporated into obviously other embodiments in the which the rotation axis A is otherwise oriented.

The base frame 2a, 2b, 2c, 2d comprises a base body 2a for resting on the ground, at the top of which are arranged the grip and rotation moving means 3, composed of a spindle with self-centering runners or the like.

On the base body 2a is fitted a substantially vertical column 2b, from which a substantially horizontal arm 2c, extends overhanging the spindle.

At the free end of the arm 2c is located a substantially vertical upright 2d that extends downwards and on which is fitted an operating head 4 for fitting and removing the tire P on, and from, the rim C.

The arm 2c and the upright 2d are adjustable in length in order to position the operating head 4 near the first retention flange F'. Usefully, the operating head 4 comprises a support structure 5a, 5b associable at the lower extremity of the upright 2d.

The support structure 5a, 5b is composed of a first plate 5a and of a second plate 5b arranged in a vertical plane, and parallel to one another.

The operating head 4 also comprises a guiding nut 6, associated with the surface of the first plate 5a,5b, and a guiding wing 7, associated with the surface of the second plate 5b.

The guiding nut 6 and the guiding wing 7 are designed to be arranged near the first retention flange F' and to guide the first bead T' during the fitting and removal operations of the tire P.

Furthermore, the operating head 4 comprises a grip tool 8 suitable for gripping the first bead T'.

For this purpose, the grip tool 8 includes an active extremity 9, at least partially hook shaped, for gripping the first bead T'.

Such active extremity consists of a curved foot that extends from the lower base of the grip tool 8 along a substantially radial direction with respect to the rim C.

The grip tool 8 is arranged between the guiding nut 6 and the guiding wing 7 and, more in detail, is placed in the inner space defined in the support structure 5a, 5b; in other words, the first plate 5a and the second plate 5b are arranged on opposite sides of the grip tool 8.

Actuator assembly 10 is provided for moving the grip tool 8 between a first guiding configuration of the first bead T', in which the active extremity 9 is arranged near the guiding nut 6 and the guiding wing 7, and a second grip configuration of the first bead T'. Actuator assembly 10 is housed, at least partially, between first plate 5a and second plate 5b.

Advantageously, the active extremity 9 is shaped with a substantially oblique first profile 11 and second profile 12 suitable for cooperating with the guiding nut 6 to guide the first bead T' when the grip tool 8 is arranged in the first configuration.

In particular, profiles 11, 12 are the edges defined by the active extremity 9 when this is sectioned by a substantially vertical section plane substantially tangent to the rim C, as shown in the illustrations 3 and 4.

Conventionally indicated as first profile 11 is the upper edge of this section of the active extremity 9 while second profile 12 is the lower edge.

The first profile 11 and the second profile 12 are shaped to connect up to the surfaces of the guiding nut 6 with continuity when the grip tool 8 is arranged in the first guiding configuration.

More in detail, the first profile 11 of the active extremity 9 is slightly convex, with convexity turned upwards, and is sloped along a connection direction suitable for connecting the guiding nut 6 to the guiding wing 7 with continuity and for guiding the first bead T' during the removal of the tire P from the rim C.

In other words, during the removal operation of the tire P, the first bead T' is meant to be placed below the guiding wing 7 and above the guiding nut 6 passing over the first profile 11 of the active extremity 9, as shown in illustration 3.

The second profile 12 of the active extremity 9, on the other hand, is slightly concave, with concavity turned downwards, and is sloped along a connection direction suitable for connecting the guiding nut 6 to the guiding wing 7 with continuity, and for guiding the first bead T' during the fitting of the tire P on the rim C.

In other words, during the fitting operation of the tire P the first bead T' is meant to be placed above the guiding wing 7 and below the guiding nut 6 passing under the second profile 12 of the active extremity 9, as shown in illustration 4.

In both cases, both during removal and during fitting, the positioning of the grip tool 8 in the first guiding configuration and the particular wedge conformation of the profiles 11, 12 allow the active extremity 9 and the guiding nut 6 to cooperate perfectly as a single deflector of the first bead T'.

Figure 10:
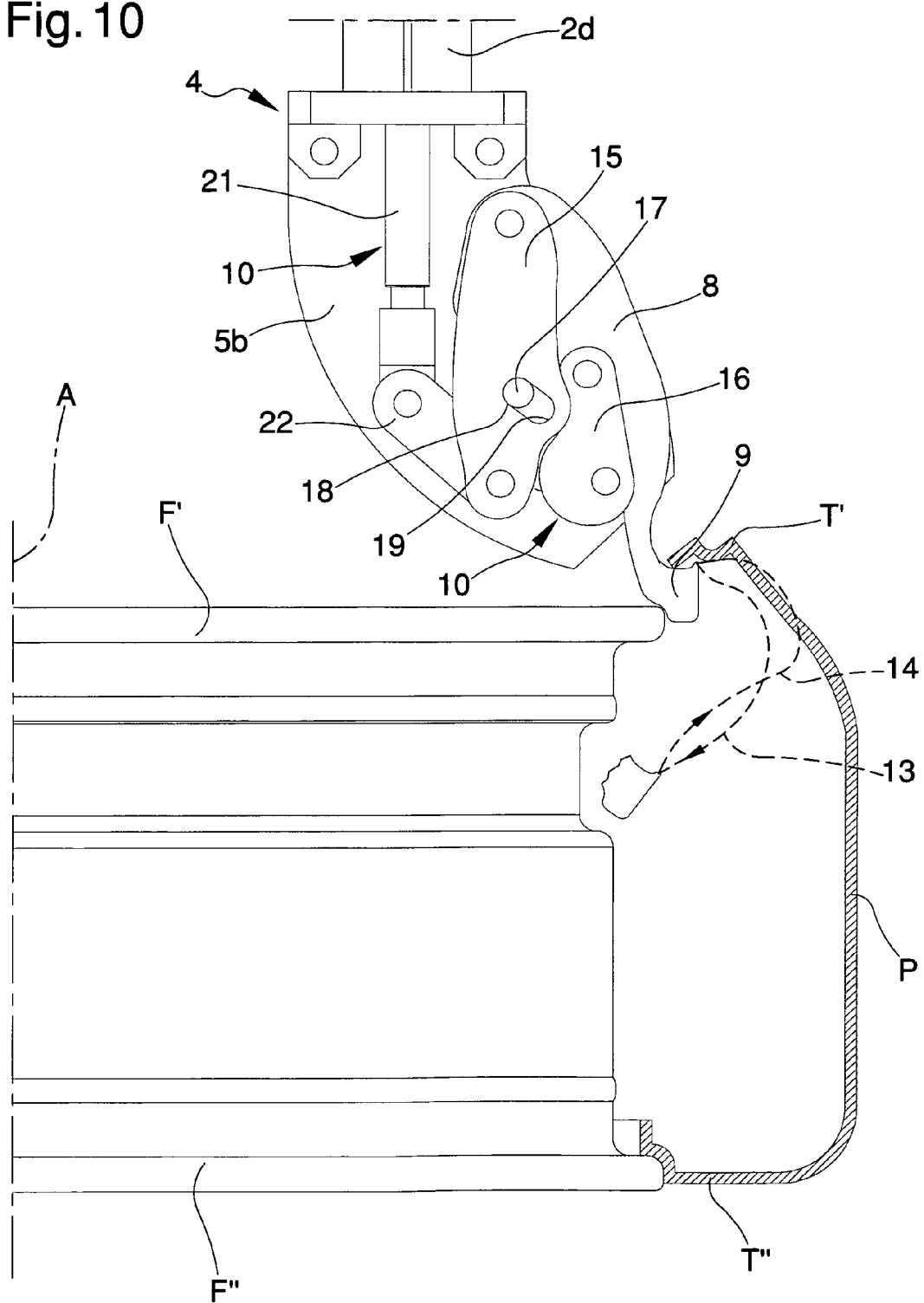

Advantageously, to facilitate the gripping of the first bead T' by the grip tool 8, actuator assembly 10 is suitable for moving the grip tool 8, and more specifically its active extremity 9, from the first configuration to the second configuration along a first trajectory 13, and from the second configuration to the first configuration along a second trajectory 14, substantially different from the first trajectory 13 (FIG. 10).

For this purpose, actuator assembly 10 comprises at least an articulated joint with double-lever mechanism 15, 16 placed between the grip tool 8 and the support structure 5a, 5b, in which at least one of the centres of rotation of such articulated joint with double-lever mechanism 15, 16 is mobile between a first relative position, for the definition of the first trajectory 13, and a second relative position, for the definition of the second trajectory 14.

The articulated joint with double-lever mechanism 15, 16 is housed between the plates 5a, 5b and is composed of a first lever 15 and of a second lever 16, both hinged to both the support structure 5a, 5b and to the grip tool 8. The hinging fulcrum 17 of the first lever 15 at the support structure 5a, 5b is mobile between the first relative position and the second relative position.

The hinging fulcrum 17 advantageously consists of a rotation pin which is located between the plates 5a, 5b and that the pin is fitted for sliding movement within a guiding slot 18 formed in the first lever 15.

The guiding slot 18 comprises a first closed end-of-stroke extremity 19, corresponding to the positioning of the hinging fulcrum 17 in the first relative position, and a second closed end-of-stroke extremity 20, corresponding to the positioning of the hinging fulcrum 17 in the second relative position.

In the particular embodiment of the invention shown in the illustrations, therefore, the hinging fulcrum 17 is fixed with respect to the support structure 5a, 5b, and its passage between the first relative position and the second relative position consists in a relative movement due to the movement of the first lever 15 with the guiding slot 18.

Alternative embodiments of the present invention cannot however be ruled out in which the guiding slot 18 is obtained on the plates 5a, 5b and the rotation pin 17 is integral with the first lever 15, in which case the movement of the rotation pin 17 between the first relative position and the second relative position results in an actual movement.

Actuator assembly 10 also comprises an actuator device 21 suitable for operating the articulated joint with double-lever mechanism 15, 16.

Such actuator device 21 is of the fluid-operation linear type such as a pneumatic and/or hydraulic jack.

Usefully, such actuator device 21 is integrated inside the upright 2d and is associated with the first lever 15 by interposition of a connecting link 22.

The connecting link 22, in particular, is hinged, on one side, to a mobile extremity of the actuator device 21 and, on the other side, is hinged to a portion of the first lever 15 which, with respect to the guiding slot 18, is substantially opposite the hinging point of the first lever 15 to the grip tool 8.

The operation of the machine 1 is the following.

To remove the tire P from the rim C, the first thing to do is fit the wheel R on the spindle 3 and position the operating head 4 near the first retention flange F'

In this position, the guiding nut 6 is positioned astride the first retention flange F' while the guiding wing 7 is positioned above and substantially parallel to the flange itself.

Initially, furthermore, the grip tool 8 is arranged in the first guiding configuration, with the hinging fulcrum 17 arranged at the second closed end-of-stroke extremity 20 (FIG. 6).

From this departure position, the actuator device 21 is operated and this, by means of the connecting link 22, operates on the first lever 15.

As a result of this thrust and of the resistance produced by the first bead T', the first lever 15 moves along the guiding slot 18 moving the hinging fulcrum 17 to the first closed end-of-stroke extremity 19 (FIG. 7).

The first lever 15 is then pushed to turn around the hinging fulcrum 17, moving the grip tool 8 from the first guiding configuration to the second grip configuration and allowing it to fit between the first retention flange F' and the first bead T' (FIG. 8).

This movement occurs along the first trajectory 13, particularly narrow to facilitate the entry of the grip tool 8 between the first retention flange F' and the first bead T'.

At this point, the operation of the actuator device 21 in the opposite direction allows the first lever 15 to move along the guiding slot 18, placing the hinging fulcrum 17 at the second closed end-of-stroke extremity 20 (FIG. 9) and therefore allows the grip tool 8 to pass from the second grip configuration to the first guiding configuration, thus returning to the position of departure and dragging with it the first bead T' beyond the first retention flange F' (FIG. 10).

Figure 3:
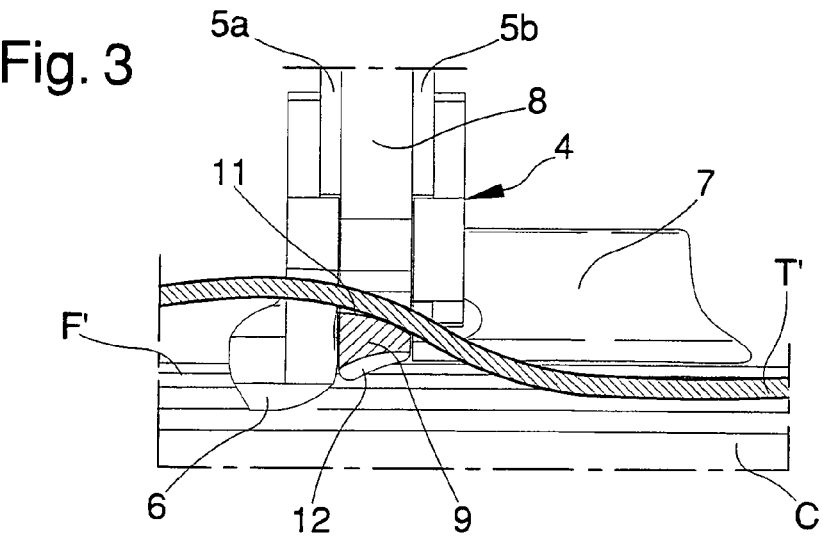
FIG. 3 is a section view of the machine according to the invention along a substantially vertical plane and tangent to the rim, with the grip tool in the first guiding configuration during the tire removal operation.

In this position, a portion of the first bead T' remains positioned under the guiding wing 7 while another portion moves into position above the guiding nut 6, taking on the conformation of FIG. 3.

The fact is underlined that the return stroke of the grip tool 8 occurs along the second trajectory 14 which is shaped to remove the first bead T' in an optimal way, without causing excessive distortions and deformations in the tire P.

To remove the first bead T' from the first retention flange F' along the entire perimeter of the rim C it therefore suffices to rotate the turntable 3.

Figure 4:
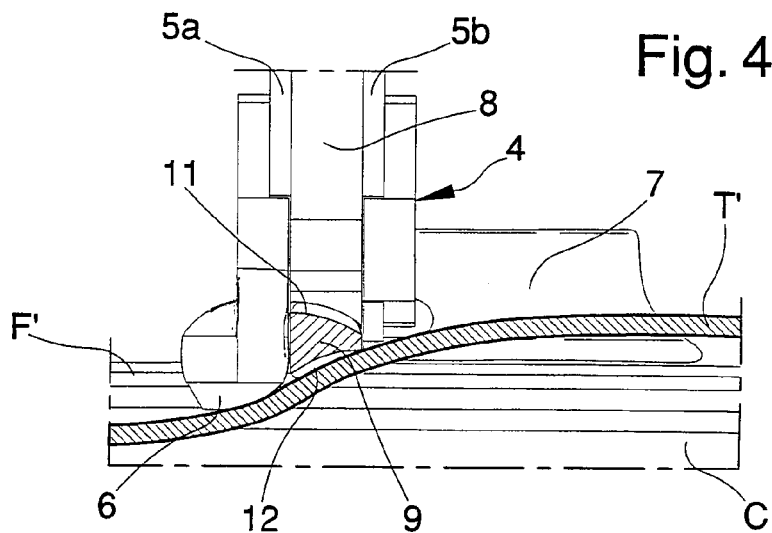
FIG. 4 is a section view of the machine according to the invention along a substantially vertical plane and tangent the rim, with the grip tool in the first guiding configuration during the tire fitting operation.
Figure 5:
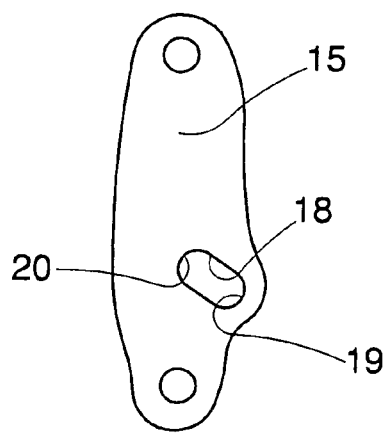
FIG. 5 is a front view of the first lever provided in the machine according to the invention.

If you wish to fit the tire P on the rim C, on the other hand, the tire P must be placed above the rim C and the first bead T' must be forced into place in the position shown in the FIG. 4, e.g., by using auxiliary tools such as push rollers or the like of the known type.

In this position, in actual fact, a portion of the first bead T' remains above the guiding wing 7 while another portion is placed under the guiding nut 6 and the second profile 12 of the grip tool 8.

At this point, the rotation of turntable 3 allows forcing the first bead T' to move over the first retention flange F' along the entire circumference of the rim C. It has in point of fact been ascertained how the described invention achieves the proposed objects.

Modifications and revisions of the unique tool may occur to the skilled artisan in the field of the invention. Consequently, the appended claims should be broadly construed in a manner consistent with the spirit and scope of the inventor's contribution to the useful arts and sciences, and should not be limited to the literal terms of the appended claims.

What is claimed is:

1. A machine for fitting and removing the wheel tires of vehicles, comprising:
    a base frame including turntable means for gripping and rotation moving at least a rim of wheels for vehicles with at least a retention flange for a bead of a tire to be fitted and/or removed on/from said rim;
    an operating head which is associable with said base frame and is positionable near said retention flange;
    wherein said operating head comprises:
        a guiding nut for said bead;
        a guiding wing for said bead;
        a grip tool for gripping said bead which is arranged between said guiding nut and said guiding wing and comprises a shaped active extremity with a substantially oblique profile suitable for cooperating with said guiding nut for guiding said bead; and
        actuator assembly for moving said grip tool between a first guiding configuration of said bead, in which said active extremity is arranged near said guiding nut and near said guiding wing, and a second grip configuration of said bead, said actuator assembly being suitable for moving said grip tool from said first configuration to said second configuration along a first trajectory and from said second configuration to said first configuration along a second trajectory substantially different from said first trajectory, and
    said guiding nut, said guiding wing, said grip tool, and said actuator assembly being mounted upon said operating head.

2. The machine according to claim 1, wherein said profile of the active extremity is shaped to connect with a surface of said guiding nut with continuity when said grip tool is arranged in said first configuration.

3. The machine according to claim 2, wherein said profile of the active extremity is inclined along a connection direction suitable for connecting said guiding nut with said guiding wing with continuity and for guiding said bead during the removal of said tire from said rim.

4. The machine according to claim 2, wherein said profile of the active extremity is inclined along a connection direction suitable for connecting said guiding nut with said guiding wing with continuity and for guiding said bead during the fitting of said tire on said rim.

5. The machine according to claim 2, wherein said active extremity is shaped with two of said profiles, of which one is inclined along a connection direction suitable for connecting said guiding nut with said guiding wing with continuity to guide said bead during the removal of said tire from said rim, and the other is inclined along a connection direction suitable for connecting said guiding nut with said guiding wing with continuity to guide said bead during the fitting of said tire on said rim.

6. The machine according to claim 1, wherein said actuator assembly comprises an articulated joint with double lever mechanism placed in between said gripping tool and a support structure associable with said base frame.

7. The machine according to claim 6, wherein at least one of the centres of rotation of said articulated joint with double lever mechanism is mobile between a first relative position for the definition of said first trajectory and a second relative position for the definition of said second trajectory.

8. The machine according to claim 7, wherein said articulated joint with double lever mechanism comprises a first lever and a second lever hinged to said support structure and to said griping tool, the hinging fulcrum of said first lever to said support structure being mobile between said first relative position and said second relative position.

9. The machine according to claim 8, wherein said hinging fulcrum comprises at least a rotation pin, which is associated with at least one between said support structure and said first lever and which is sliding along at least a guiding slot obtained in the other between said support structure and said first lever.

10. A machine according to claim 9, wherein said rotation pin is associated with said support structure and said guiding slot is obtained in said first lever.

11. The machine according to claim 9, wherein said guiding slot comprises a first end-of-stroke extremity corresponding to said first relative position and a second closed end-of-stroke extremity corresponding to said second relative position.

12. The machine according to claim 6, wherein said actuator assembly comprises an actuator for operating said articulation joint with double lever mechanism.

13. The machine according to claim 12, wherein said actuator is of the fluid-operating linear type.

14. The machine according to claim 12, wherein said actuator is associated with said gripping tool by interposition of a connecting link.

15. The machine according to claim 12, wherein:
one of the centers of rotation of said articulated joint with double lever mechanism is mobile between a first relative position for the definition of said first trajectory and a second relative position for the definition of said second trajectory;
said articulated joint with double lever mechanism comprises a first lever and a second lever hinged to said support structure and to said gripping tool, the hinging fulcrum of said first lever to said support structure being mobile between said first relative position and said second relative position;
a connecting link joins said actuator to said first lever and said second lever.

16. The machine according to claim 6, wherein said support structure comprises a first plate and a second plate arranged on opposite sides of said gripping tool.

17. The machine according to claim 16, wherein said guiding nut is associated with said first plate and said guiding wing is associated with said second plate.

18. The machine according to claim 1, wherein the first trajectory of said grip tool facilitates entry of said grip tool between the retention flange and the bead of a tire, and the second trajectory of said grip tool removes the bead of a tire without causing distortions and deformations in the tire.

* * * * *